(12) United States Patent
Shafer et al.

(10) Patent No.: US 7,804,204 B1
(45) Date of Patent: Sep. 28, 2010

(54) CAPACITIVE SENSING SYSTEM FOR POWER CUTTING TOOL

(75) Inventors: David C. Shafer, Menlo Park, CA (US); Jean-Pierre Krauer, San Jose, CA (US)

(73) Assignee: Power Tool Institute, Cleveland, OH (US)

( * ) Notice: Subject to any disclaimer, the term of this patent is extended or adjusted under 35 U.S.C. 154(b) by 1113 days.

(21) Appl. No.: 11/481,549

(22) Filed: Jul. 6, 2006

Related U.S. Application Data

(63) Continuation of application No. 11/437,318, filed on May 19, 2006, now abandoned.

(60) Provisional application No. 60/682,642, filed on May 19, 2005.

(51) Int. Cl.
*H02H 11/00* (2006.01)
*B26D 1/00* (2006.01)
*G06F 19/00* (2006.01)

(52) U.S. Cl. .................... 307/326; 83/13; 700/177

(58) Field of Classification Search ................ 307/326; 83/13; 700/177
See application file for complete search history.

(56) References Cited

U.S. PATENT DOCUMENTS

| 4,137,533 | A | 1/1979 | Briechle et al. |
| 5,081,406 | A | 1/1992 | Hughes et al. |
| 5,942,975 | A | 8/1999 | Sorenson |
| 5,957,263 | A | 9/1999 | Espenschied |
| 7,377,199 | B2 * | 5/2008 | Gass et al. .................. 83/13 |
| 2002/0017176 | A1 | 2/2002 | Gass et al. |
| 2002/0017178 | A1 | 2/2002 | Gass et al. |
| 2002/0017336 | A1 | 2/2002 | Gass et al. |
| 2002/0170399 | A1 | 11/2002 | Gass et al. |
| 2003/0002942 | A1 | 1/2003 | Gass et al. |
| 2003/0058121 | A1 | 3/2003 | Gass et al. |
| 2003/0090224 | A1 | 5/2003 | Gass et al. |
| 2003/0131703 | A1 | 7/2003 | Gass et al. |
| 2005/0041359 | A1 | 2/2005 | Gass et al. |
| 2005/0155473 | A1 | 7/2005 | Gass et al. |
| 2008/0025381 | A1 | 1/2008 | Lee et al. |
| 2008/0041204 | A1 | 2/2008 | Gass |

FOREIGN PATENT DOCUMENTS

| EP | 1093202 A1 | 4/2001 |
| EP | 1422022 A1 | 5/2004 |

* cited by examiner

*Primary Examiner*—Michael Rutland Wallis
(74) *Attorney, Agent, or Firm*—K&L Gates LLP (57) ABSTRACT

A capacitive sensing system for use with a power cutting tool of the type which has an exposed, moveable blade adjacent a work surface is disclosed. The sensing system drives an excitation voltage onto the exposed blade and monitors the current drawn from the blade, detects changes in the amplitude and phase and analyzes the characteristics of the changes to selectively trigger a reaction system.

24 Claims, 6 Drawing Sheets

CAPACITIVE SENSING SYSTEM FOR POWER CUTTING TOOL

CROSS-REFERENCE TO RELATED APPLICATIONS

This application is a continuation of U.S. patent application Ser. No. 11/437,318, filed May 19, 2006, now abandoned which claims priority to U.S. provisional application Ser. No. 60/682,642, filed 19 May 2005, both of which are hereby incorporated by reference.

BACKGROUND OF THE INVENTION

The present invention generally relates to sensing or detecting systems, and, in particular, capacitive sensing systems for power cutting tools.

Detection or sensing systems have been developed for use with various kinds of manufacturing equipment and power tools. Such detection systems are operable to trigger some type of condition mitigation mechanism by detecting or sensing the proximity of the operator to some part of the equipment or contact with some part of the equipment by the operator.

For example, it is known to use a capacitive contact sensing system in a table saw to detect contact between the operator and the blade. Such systems, however, have difficulty distinguishing certain materials, which may cause false activations of the condition mitigation mechanism. Accordingly, improved and more robust capacitive contact sensing systems are needed.

SUMMARY OF THE INVENTION

In one general aspect, the present invention is directed to a capacitive sensing system for use with a power cutting tool of the type which has an exposed blade adjacent a work surface. The sensing system drives an excitation voltage onto the exposed blade and monitors the current drawn from the blade, detects changes in the amplitude and phase of the signal, and analyzes the characteristics of the changes to detect a condition indicative of contact between a portion of the user's body and the blade. When such contact is detected, a reaction system may be activated to address the condition.

According to various embodiments, the capacitive sensing system comprises a drive signal source for generating a drive signal, and an excitation plate in communication with the drive signal source for capacitively coupling the drive signal to the movable (e.g., rotatable) blade. The system also comprises a current sensing element coupled to the excitation plate for generating a current sense signal indicative of the instantaneous current drawn by the movable blade, and a processor in communication with the current sensing element. The processor detects the condition indicative of contact between an object (e.g., a portion of the user's body) and the movable blade based on variations in both an in-phase current component signal and a quadrature current component signal derived from the current sense signal. The system may also comprise a shield surrounding at least a portion of the movable blade. The shield may be driven to the same potential as the excitation plate by the drive signal source. Also, the excitation plate may be in parallel with the blade and on the same side of the blade as the arbor.

In another general aspect, the present invention is directed to a power cutting tool, such as a table saw, having the above-described capacitive sensing system.

According to yet another general aspect, the present invention is directed to a method for sensing contact between the operator and a movable blade of a power cutting tool. The method may comprise, according to various embodiments, the steps of: (1) capacitively coupling a drive signal from an excitation plate to the movable blade; (2) generating a current sense signal indicative of the instantaneous current drawn by the movable blade; and (3) detecting a condition indicative of contact between the operator and the movable blade based on variations in both an in-phase current component signal of the current sense signal and a quadrature current component signal of the current sense signal.

DESCRIPTION OF THE DRAWINGS

Various embodiments of the present invention are described herein by way of example in conjunction with the following figures, wherein.

DETAILED DESCRIPTION

Figure 1:
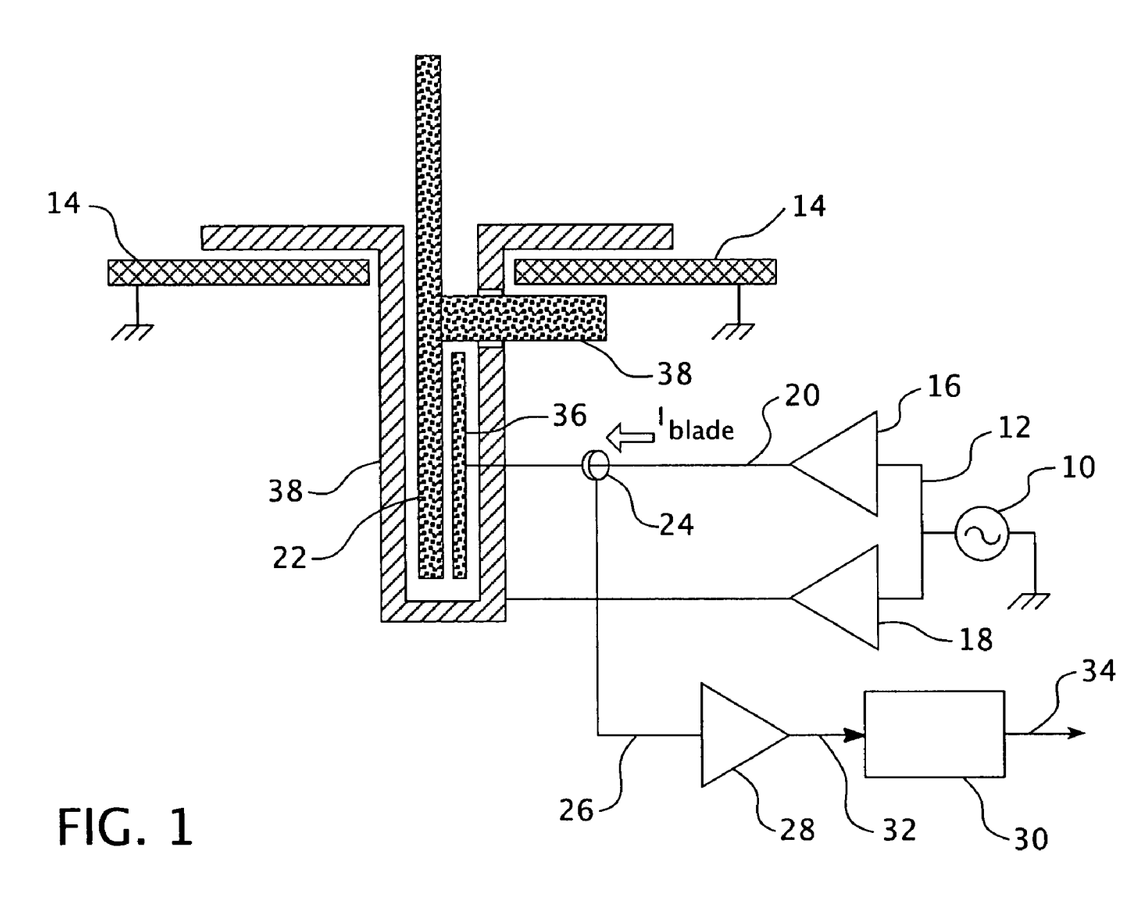
FIG. 1 is an idealized partially schematic diagram of a preferred embodiment of the capacitive sensing system of the present invention shown as implemented in a table saw.

One embodiment of a capacitive sensing system according to the present invention is shown in the idealized partially schematic diagram of FIG. 1, in which the capacitive sensing system is shown being implemented in a table saw. It should be understood that the capacitive sensing system can be used with other types of tools and machinery (such as other types of power cutting tools), particularly those with an exposed, movable (e.g. rotatable) blade, and that such implementations are within the scope of the present invention. For example, the capacitive sensing system may also be used in portable saws, such as a circular saw or a jig saw.

The system operates, according to various embodiments, by driving an excitation voltage onto the movable blade 22, and detecting the current drawn from the blade 22. This current shows changes in both amplitude and phase when the blade 22 comes into contact with a conductive object (such as a user's hand or other body part, as well as work pieces), and the characteristics of these changes can be used to selectively trigger the operation of a reaction system. One such reaction system is described in U.S. patent application Ser. No. 11/374,319, filed 13 Mar. 2006, which is incorporated herein by reference.

The embodiment of the sensing system shown in FIG. 1 comprises an oscillator 10 that generates a time-varying signal (such as a sine-wave) on line 12. The frequency of the signal may be chosen to optimize the distinction between contact with the operator and the wood or other material to be cut by the power cutting tool. This frequency may be, for example, 1.22 MHz, but other frequencies can also be used, as well as non-sinusoidal wave shapes. The oscillator 10 is referenced to the saw table 14 or other metallic structure as a local ground. As shown in FIG. 1, the blade 22 is disposed vertically in an opening defined by the saw table (or work surface or cutting surface or platform) 14.

The oscillator 10 may be connected by line 12 to drive two voltage amplifiers 16, 18. The first voltage amplifier 16 has its output connected to line 20, which is operatively coupled to a saw blade 22 and drives the saw blade 22 to follow the oscillator's output. A current sensing element 24 operatively coupled to line 20 provides a signal on line 26 that is fed to an amplifier 28 that is then connected to a processor 30 by line 32. The current sensing element 24 may be, for example, a current sense transformer, a current sense resistor, or a Hall Effect current sense device. Other types of current sensing elements may also be used. An output line 34 from the processor 30 is operatively connected to the reaction system so that the processor 30 can trigger the reaction system if predetermined conditions are detected.

The signal on line 26 is indicative of the instantaneous current drawn by the blade 22. Because the saw blade 22 is in motion during operation of the table saw, and because an effective connection is preferably maintained over the life of the saw, this connection is preferably made through an excitation plate 36. The plate 36 may be driven by the first voltage amplifier 16, and may have a large (e.g., approximately 100 picoFarad (pF)) capacitance relative to the blade 22. Also, the plate 36 may be held in a stable position relative to the side of the blade 22, so that this capacitance remains large through the operating life of the saw. The excitation plate 22 is preferably designed and constructed to follow the blade 22 as its height and bevel angle are adjusted.

The capacitance between a user's body and the saw table 14 (or power line ground if one is present) is preferably in the range of approximately 30-50 pF, and as long as the capacitance between the excitation plate 36 and the saw blade 22 is larger than this, the detection thresholds should not be unduly affected by changes in the plate-to-blade capacitance. The plate 36 may also be arranged in parallel with the blade 22 on the side where the blade 22 rests against the arbor 38, so that changes in blade thickness do not affect the clearance between the blade 22 and the plate 36. Other methods of excitation, including contact through the arbor bearings or brush contact with the shaft or the blade, could be used to the same effect. However, the excitation plate arrangement likely has advantages in the long-term stability of the excitation connection.

The second amplifier 18 may be connected to and drive a shield 38 to the same potential as the excitation plate 36. Also, the current drawn by the shield need not be monitored. The shield 38 preferably extends around the blade 22 under the table 14, and is spaced some distance away from the blade 22 on the top of the table 14. This greatly reduces the static capacitance between the blade 22 and the table 14, which may serve as a ground plane (the table need not be electrically connected to earth ground as shown). The shield 38 may be a continuous pocket as shown here, or may be a mesh or other guard that is electrically equivalent to a Faraday cage at the excitation frequencies provided by the oscillator 10. The shield 38 may have a component that moves with the blade adjustments, or may be large enough to accommodate the blade's adjustment as well as the various blades that may be fitted on the table saw. The shield 38 is preferably designed to move with the blade adjustments, and includes a throat plate area of the table top 14.

Figure 8:
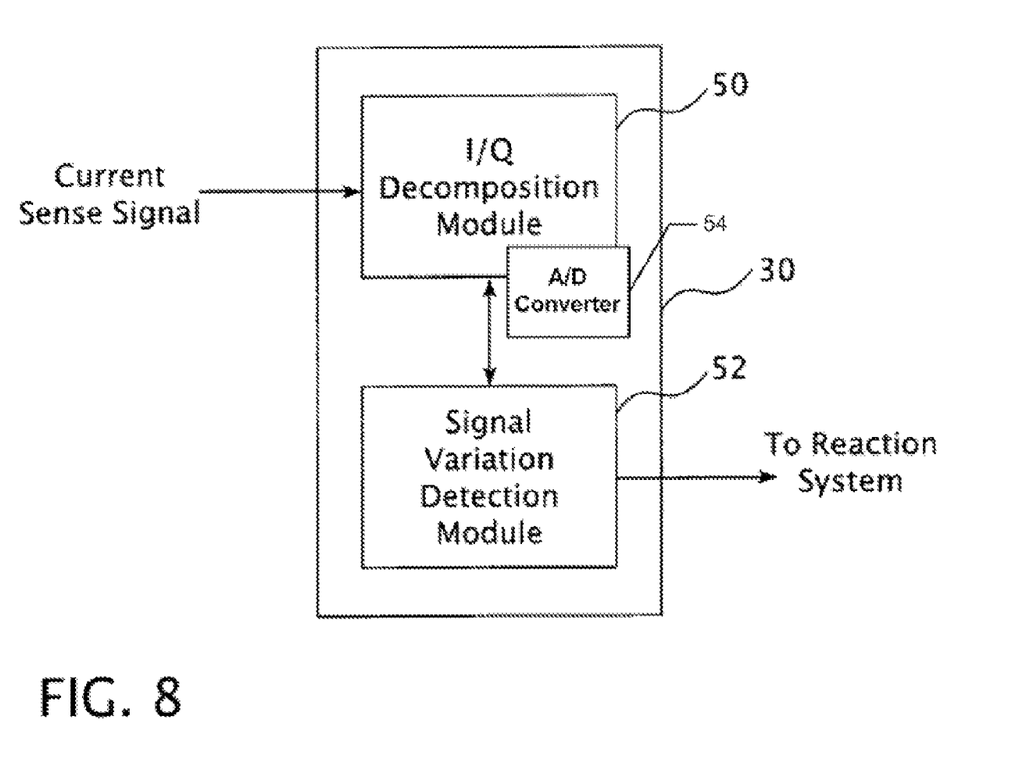
FIG. 8 is a block diagram of a processor of the capacitive sensing system according to various embodiments of the present invention.

FIG. 8 is a block diagram of the processor 30 according to various embodiments of the present invention. In the illustrated embodiment, the processor 30 includes an I/Q decomposition module 50 and a signal variation detection module 52. As explained in more detail below, the I/Q decomposition module 50 may generate from the current sense signal from the current sensing element 24 an in-phase current component signal that is in-phase with an output from the oscillator and a quadrature current component signal that is in quadrature with the output from the oscillator. The signal variation detection module 52 may analyze the in-phase and quadrature signals to detect a condition indicative of contact between the portion of the user's body and the blade 22 based on variations in the in-phase and quadrature signals.

The modules 50, 52 may be implemented as software code stored on a memory device to be executed by the processor 30 using any suitable computer instruction type. According to various embodiments, the modules 50, 52 may be implemented as firmware stored in a memory device, such as ROM, to be executed by the processor 30. According to other embodiments, some or all of the components of the module 50, 52 may be implemented with discrete components.

The I/Q decomposition module 50 may sample the measured current from the blade drive amplifier 16 using I/Q decomposition. In this operation, the current is conditioned and converted into two components, one of which is in-phase and the other in quadrature with the oscillator 10 output. These components are low pass filtered (performed by the I/Q decomposition module 50, for example), and sampled by an A/D converter 54 (preferably performed by the I/Q decomposition module 50). The cutoff frequency of the low pass filters may be selected to match the sample rate of the A/D converter 54. This operation provides both amplitude and phase information for the current drawn from the blade 22, for variations which are contained within a bandwidth equal to twice the bandwidth of the low pass filters, centered on the oscillator frequency. Therefore, by selecting the bandwidth of the low pass filters and the system sampling rate to match the expected variations in the current drawn from the blade 22 as the blade teeth make the initial contact with the user, complete information on the current variations may be obtained without the need for excessively large sample rates.

In addition to the current measurement as outlined above, similar I/Q decomposition may be performed by the I/Q decomposition module 50 for the blade drive voltage, which can be used to monitor the operation of the system or used to scale the current components in the processor 30 in order to enable the use of a less-stable blade voltage drive.

Figure 2:
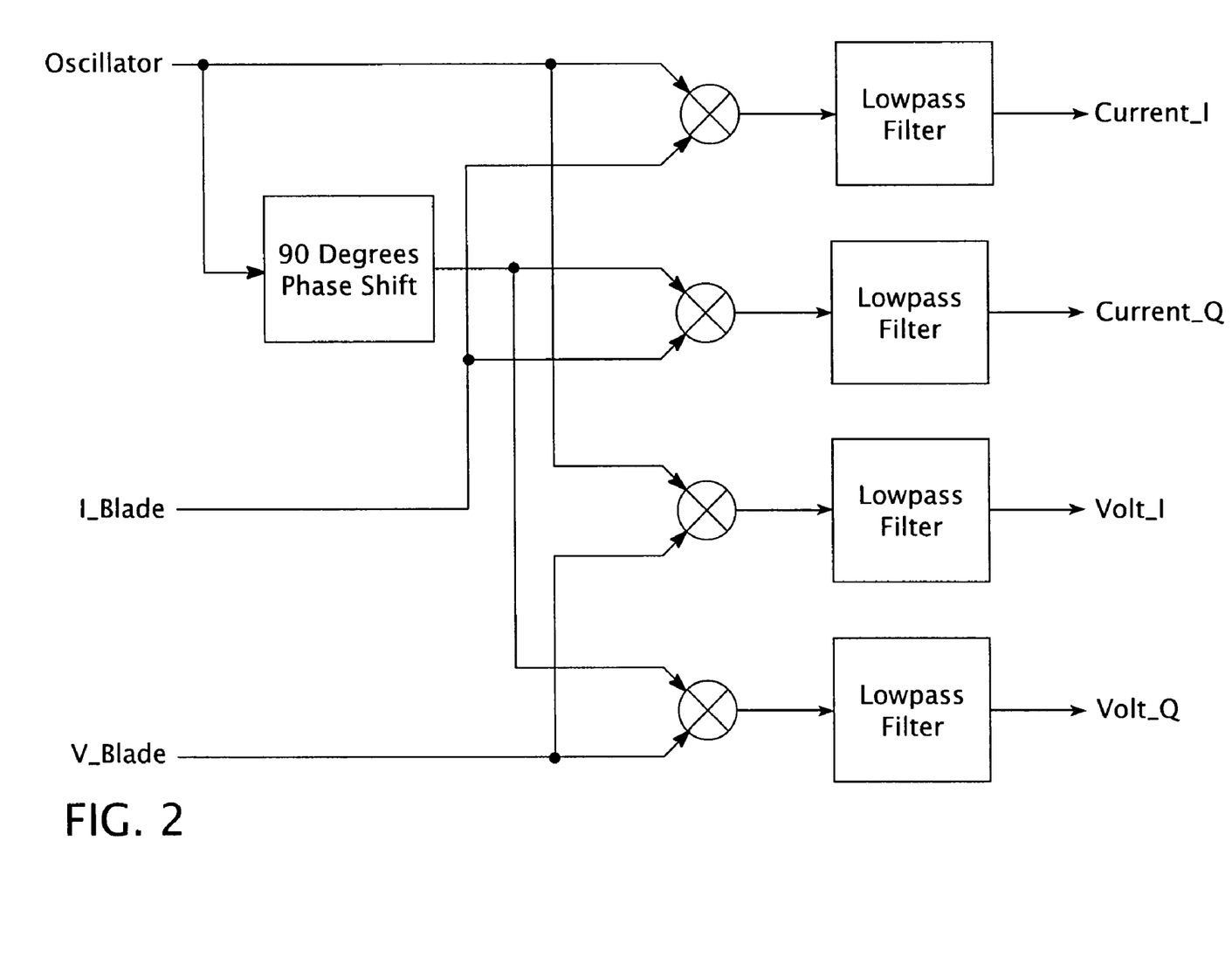
FIG. 2 is a signal flow chart illustrating a portion of the operation of the preferred embodiment.

The operation of I/Q decomposition module 50 according to various embodiments is illustrated in the signal flow diagram of FIG. 2. The above described operation illustrates the preferred processing, although it should be understood that alternative means of measuring the blade current may be employed to similar effect. For example, the blade voltage may be used in the mixing operation (in both direct and 90-degree-shifted forms), or the amplitudes of the voltage and current may be measured along with their phase relationship.

When no conductive objects are present in contact with, or very close to, the saw blade 22, the capacitance from the blade 22 to ground (e.g., the table 14) is relatively low and relatively constant. The current drawn by the blade 22 is also relatively low, and therefore both the in-phase and quadrature components of the current will be small. When a user's hand (or other body part) closely approaches or contacts the blade 22, it appears as a relatively low resistance in series with a larger capacitance to ground (to the earth, or to the table 14). This increases the current drawn by the blade 22.

Once the current components are sampled as described above, digital processing is applied by the signal variation detection module 52 to distinguish the event of contact with the blade 22, and reject the false signals caused by cutting wet wood, for example. Since there are two current components sampled, the current at any instant can be represented as a point in the complex plane, and the time evolution of this point gives information on the state of the system, and can be used to estimate the static (background) capacitance of the sensing system, when the sensing system is active but the blade 22 is stopped or there are no materials near the blade. This is useful for self-diagnostics, allowing real-time determination of proper sensing system functioning.

The presence of wet wood or other cut materials in contact with the blade 22 presents a moderate resistance in series with a large capacitance to the saw table 14 (ground). Contact of the blade 22 with a portion of the user's body presents a small resistance in series with a moderate to large capacitance to ground.

Figure 3:
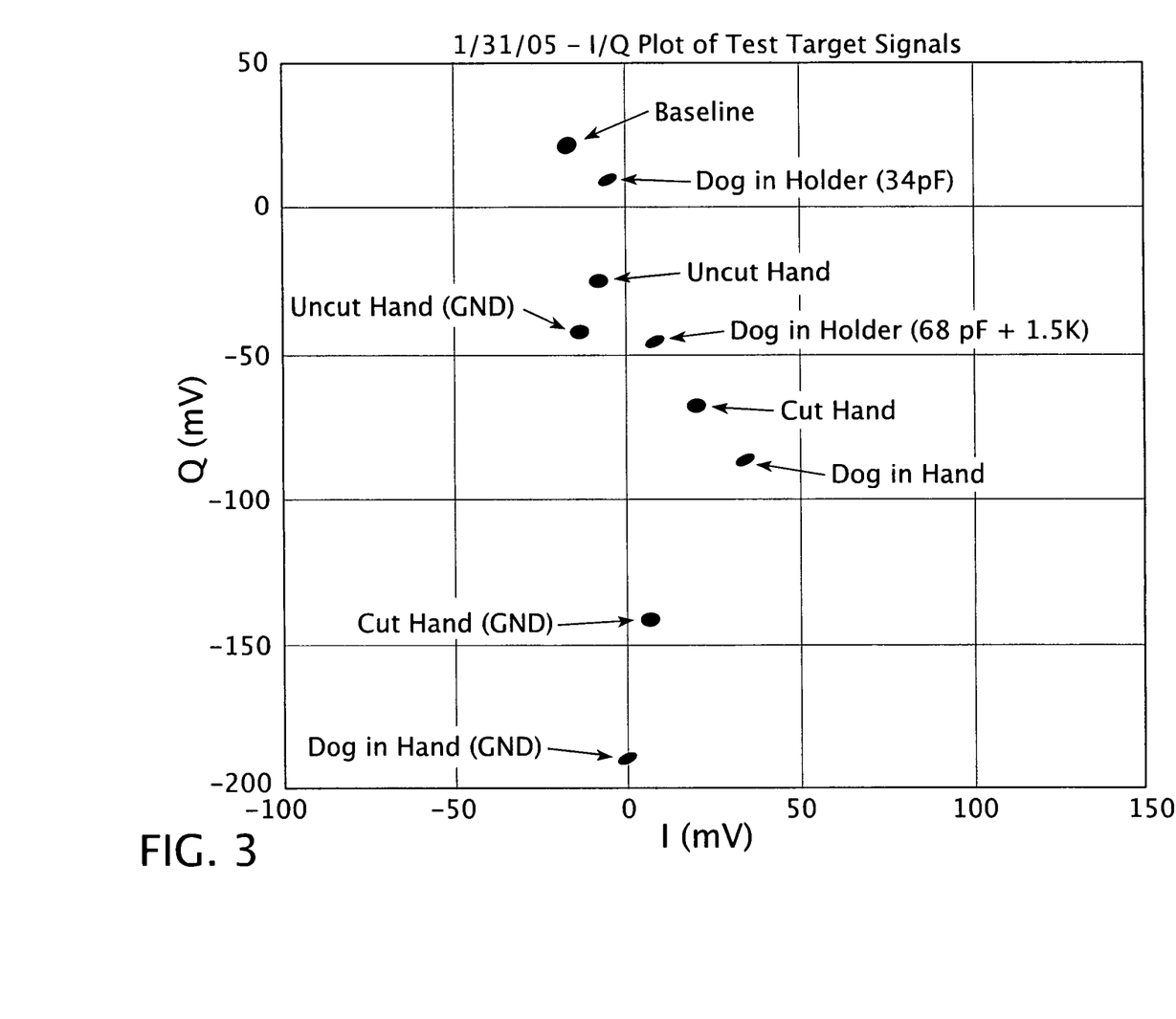
FIG. 3 is a chart illustrating points in a complex plane that are obtained for various samples that were obtained during operation of the preferred embodiment.

The chart illustrated in FIG. 3 shows the points in the complex plane that are obtained for several sample objects that were placed in contact with a stationary blade. These sample objects are identified in the drawing and include the following: 1) an uncut hand pressing into a single blade tooth, with no other contact with the saw or ground; 2) the same hand pressing into a single tooth, but with a small incision in the skin to get below the outer layer of the epidermis (no other contact with the saw or ground); 3) a hot dog, in series with a 34 pF capacitor which is connected to ground: 4) the same hot dog, in series with a combination of 68 pF and a 1.5 K Ohm resistor, to ground; 5) the same hot dog, held in the hand, with no other contact with the saw or ground.

The chart also includes a point labeled "BASELINE" and was the current reading obtained in each trial before the objects were introduced. The baseline readings all cluster in a small area. For the handheld objects, an additional point is plotted (labeled "(GND)") where the other hand was laid on the table top 14. Since the change in quadrature component of the current is generally larger than the change in the in-phase component when the object is introduced, the first step in the signal processing was to normalize the currents, to maximize the ratio of the change produced by the object to the change produced by wet wood or other normal cut materials. This normalization was performed by dividing the quadrature current by a factor of 8.

Figure 4:
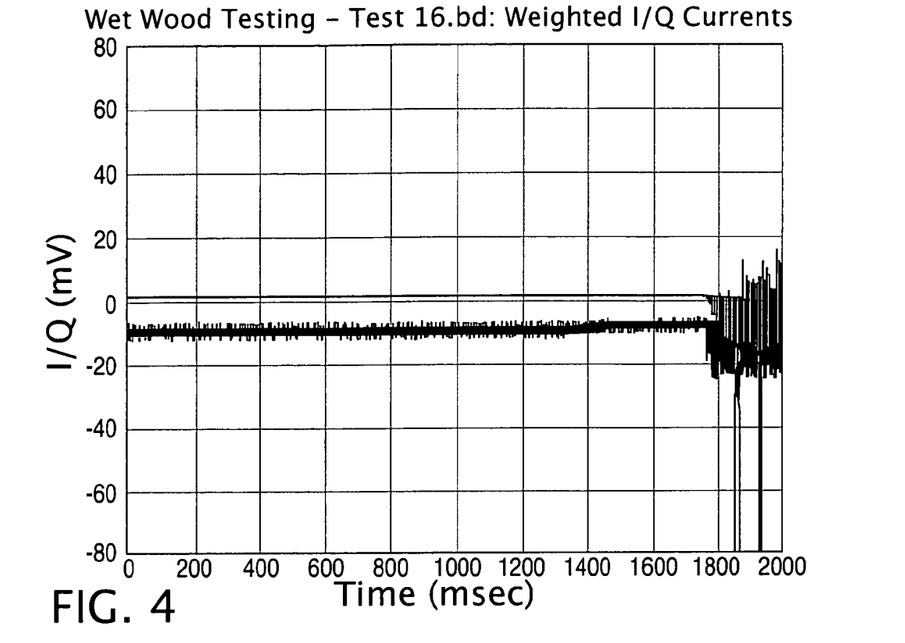
FIG. 4 is a chart illustrating normalized signals that were obtained during operation of the preferred embodiment during cutting a moderately wet wood sample with a target hot dog placed on top of the wood sample.

When the blade 22 was spinning, contact with an object results in a rapidly changing signal, as the blade teeth alternately contact and are removed from the object. An example of the normalized signals obtained by cutting a moderately wet wood sample with an object (hot dog) placed on top is illustrated in FIG. 4. The object is contacted at approximately 1800 msec in the record, and although there is a small signal from the wood, there is a much larger signal from the object contact.

Figure 5:
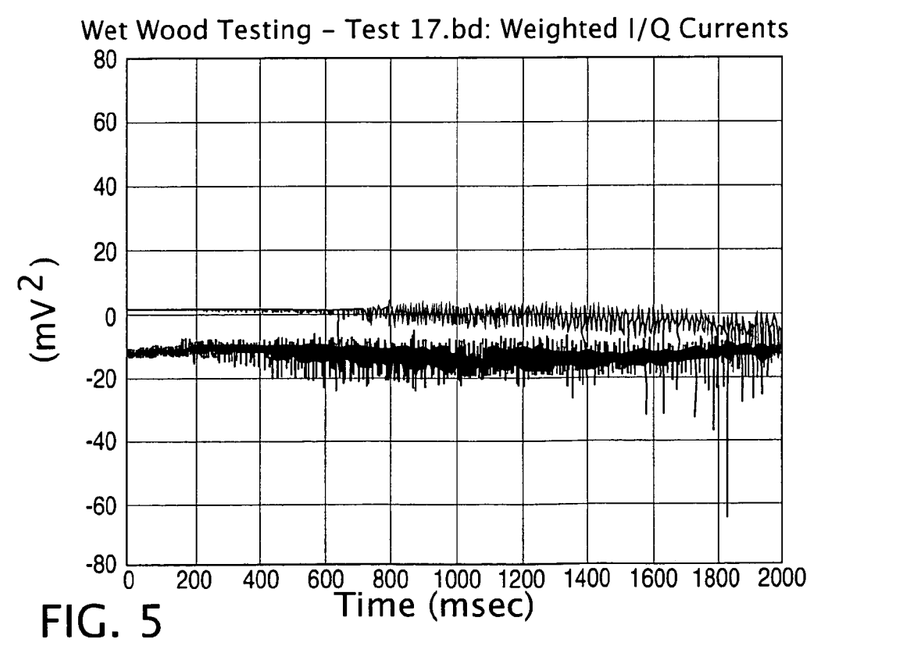
FIG. 5 is a chart illustrating normalized signals that were obtained during operation of the preferred embodiment during cutting a sample of pressure treated lumber that registered more than 100% moisture content on a conductivity meter.

For more conductive cut materials than that shown above, the current drawn from the blade 22 increases even more. However, since the wood is not as conductive as the object, the current drawn rises gradually. For example, FIG. 5 shows the current components when a sample was cut of pressure treated lumber that registers more than 100% moisture content on a conductivity meter.

Figure 6:
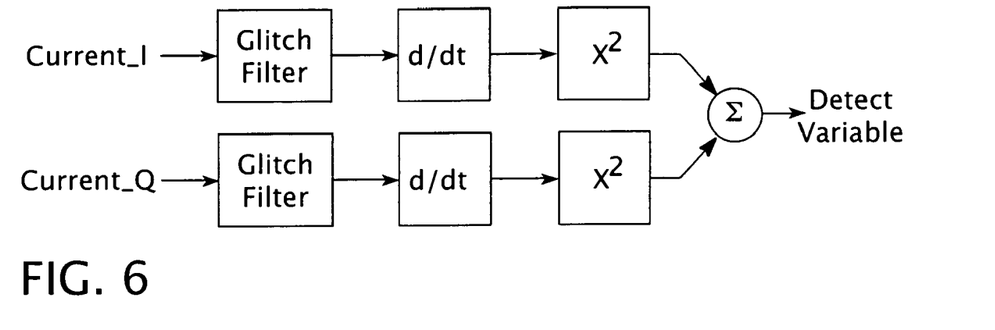
FIG. 6 is another signal flow chart illustrating another portion of the operation of the preferred embodiment.

There is a significant signal from the wet lumber, but the increase in the signal is not as large for the wet wood sample as for the contact with the more conductive object. To take advantage of this distinction, the current signals are preferably processed by the signal variation detection module 52 in the processor 30 as schematically shown in FIG. 6 before being used to detect contact with an object.

The sampled In-Phase and Quadrature Current component signals are first passed through a glitch filter (which may part of the signal variation detection module 52), which removes single sample points which are significantly different from the surrounding points, provided that the surrounding points lie within a range that is typical of the non-object conditions. This glitch filter function is useful to suppress fast, transient signals from events such as motor noise, static discharges, etc., but is not an essential part of this processing. Following the glitch filter, the component samples are differentiated by the signal variation detection module 52 to measure the variations, and the square of the magnitude of the variation is computed. This variable is compared by the signal variation detection module 52 against a fixed threshold to detect the object contact, but in other situations an adaptive threshold can be used.

Using a differentiator to determine the signal variations has an advantage in the computational requirements, but depending on the sample rate it may be advantageous to use a high-pass filter with a response tailored to the sample rate and the expected range of blade tooth contact frequencies expected in a given system.

Figure 7:
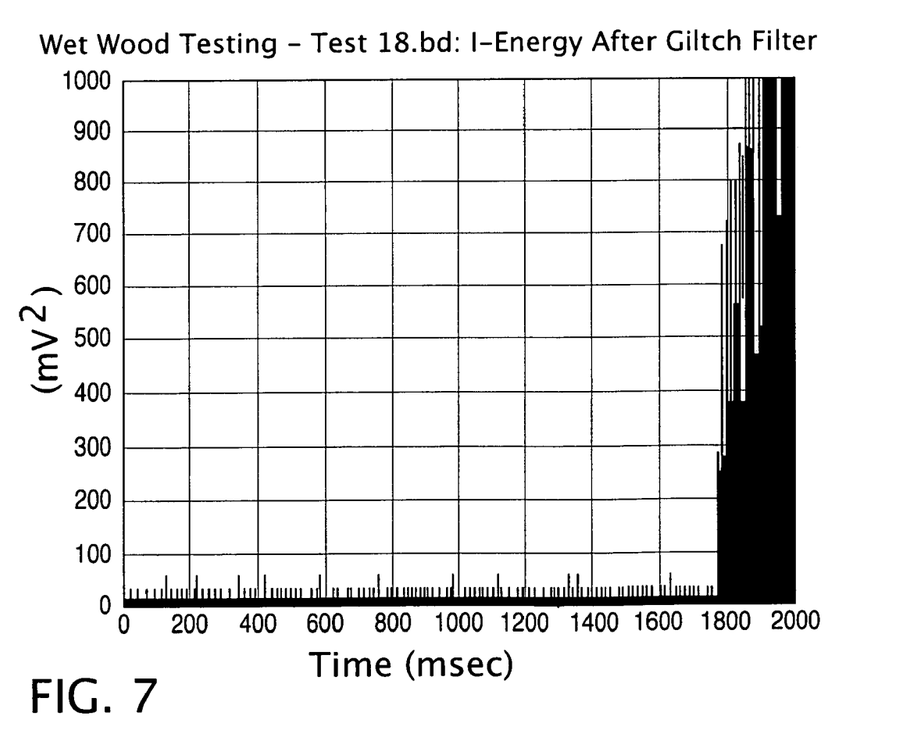
FIG. 7 is a chart illustrating the resulting detection variable using the operation shown in FIG. 6.

By applying the above-described signal processing to the signals presented above, the resulting detection variable is shown in FIG. 7. It is apparent that the signal from the wet wood (which precedes the object contact at ~1800 msec in FIG. 7) is less than the detection threshold (here, set to 500), by a factor of 10. The rate of rise of the detection variable when the object is contacted is very large, so that the resulting detection is reliable and rapid.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

What is claimed is:

1. A system for sensing contact between an object and a movable blade of a power cutting tool comprising:
   a drive signal source for generating a drive signal;
   an excitation plate in communication with the drive signal source for capacitively coupling the drive signal to the movable blade;
   a current sensing element coupled to the excitation plate for generating a current sense signal indicative of the instantaneous current drawn by the movable blade; and
   a processor in communication with the current sensing element for detecting a condition indicative of contact between the object and the movable blade based on variations in both an in-phase current component signal and a quadrature current component signal, wherein the in-phase current component signal and the quadrature current component signal are generated from the current sense signal.

2. The system of claim 1, further comprising a shield surrounding at least a portion of the movable blade, wherein the shield is driven to the same potential as the excitation plate by the drive signal source.

3. The system of claim 1, wherein the current sensing element comprises a current sense transformer.

4. The system of claim 1, wherein the excitation plate is parallel to the blade.

5. The system of claim 4, wherein the power cutting tool comprises an arbor on a first side of the blade, and wherein the excitation plate is on the first side of the blade.

6. The system of claim 5, wherein the capacitance between the blade and the excitation plate is approximately 100 pF.

7. The system of claim 1, wherein the processor is programmed to generate an in-phase voltage component signal and a quadrature voltage component signal.

8. The system of claim 1, wherein the processor is programmed to detect the condition indicative of contact between the object and the movable blade by:
  filtering the in-phase current component signal and the quadrature current component signal;
  A/D converting the filtered in-phase current component signal and the quadrature current component signal;
  differentiating the in-phase current component signal and the quadrature current component signal;
  squaring the magnitude of variations in the differentiated in-phase current component signal and the differentiated quadrature current component signal; and
  comparing the square of the magnitude of the variations to a threshold to detect the condition indicative of contact between the object and the movable blade based on the current sense signal.

9. The system of claim 8, wherein the cutoff frequency of the filter matches the sampling rate of the A/D conversion.

10. The system of claim 9, further comprising glitch filtering the in-phase and quadrature current component signals prior to differentiating the in-phase and quadrature correct component signals.

11. The system of claim 10, wherein the processor is programmed to generate an in-phase voltage component signal and a quadrature voltage component signal.

12. A system for sensing contact between a portion of a user's body and a movable blade of power cutting tool comprising:
  a drive signal source for generating a drive signal;
  an excitation plate in communication with the drive signal source for capacitively coupling the drive signal to the movable blade;
  a current sensing element coupled to the excitation plate for generating a current sense signal indicative of the instantaneous current drawn by the movable blade;
  an I/Q decomposition module in communication with the current sensing element that generates from the current sense signal an in-phase current component signal and a quadrature current component signal; and
  a signal variation detection module in communication with the I/Q decomposition module that detects the condition indicative of contact between the portion of the user's body and the movable blade based on variations in both the in-phase current component signal and the quadrature current component signal.

13. The system of claim 12, wherein the I/Q decomposition module generates an in-phase voltage component signal and a quadrature voltage component signal.

14. A power cutting tool comprising:
  a movable blade;
  a table having an opening, wherein the movable blade is disposed in the opening such that a portion of the movable blade projects above the table; and
  a capacitive sensing system that senses contact between an object and the movable blade comprising:
    a drive signal source comprising an oscillator for generating a drive signal;
    a excitation plate in communication with the drive signal source for capacitively coupling the drive signal to the movable blade;
    a current sensing element coupled to the excitation plate for generating a current sense signal indicative of the instantaneous current drawn by the movable blade; and
    a processor in communication with the current sensing element for detecting a condition indicative of contact between the object and the movable blade based on variations in both an in-phase current component signal and a quadrature current component signal, wherein the in-phase current component signal and the quadrature current component signal are generated from the current sense signal.

15. The power cutting tool of claim 14, further comprising a shield surrounding at least a portion of the movable blade, wherein the shield is driven to the same potential as the excitation plate by the drive signal source.

16. The power cutting tool of claim 15, further comprising an arbor on a first side of the blade, and wherein the excitation plate is parallel to the blade on the first side of the blade.

17. The system of claim 16, wherein the processor is programmed to detect the condition indicative of contact between the object and the movable blade by:
  filtering the in-phase current component signal and the quadrature current component signal;
  A/D converting the filtered in-phase current component signal and the quadrature current component signal;
  differentiating the in-phase current component signal and the quadrature current component signal to measure variations in the in-phase current component signal and the quadrature current component signal;
  squaring the magnitude of variations in the differentiated in-phase current component signal and the differentiated quadrature current component signal; and
  comparing the square of the magnitude of the variations to a threshold to detect the condition indicative of contact between the object and the movable blade based on the current sense signal.

18. The system of claim 17, wherein the cutoff frequency of the filter matches the sampling rate of the A/D conversion.

19. The system of claim 18, further comprising glitch filtering the in-phase and quadrature current component signals prior to differentiating the in-phase and quadrature correct component signals.

20. The system of claim 19, wherein the processor is programmed to generate an in-phase voltage component signal and a quadrature voltage component signal.

21. A method for sensing contact between an object and a movable blade of a power cutting tool, the method comprising:
  capacitively coupling a drive signal from an excitation plate to the movable blade;
  generating a current sense signal indicative of the instantaneous current drawn by the movable blade;
  generating from the current sense signal an in-phase current component and a quadrature current component, wherein the in-phase current component is in phase with the drive signal and the quadrature current component signal is in quadrature with the drive signal; and
  detecting a condition indicative of contact between the object and the movable blade based on variations in both the in-phase current component signal of the current sense signal and the quadrature current component signal of the current sense signal.

22. The method of claim 21, wherein detecting the condition comprises:
   generating from the current sense signal the in-phase current component signal and the quadrature current component signal;
   filtering the in-phase current component signal and the quadrature current component signal; A/D converting the filtered in-phase current component signal and the quadrature current component signal;
   differentiating the in-phase current component signal and the quadrature current component signal;
   squaring the magnitude of the variations in the differentiated in-phase current component signal and the differentiated quadrature current component signal; and
   comparing the square of the magnitude of the variations to a threshold to detect the condition indicative of contact between the object and the movable blade based on the current sense signal.

23. The method of claim 22, wherein the cutoff frequency of the filter matches the sampling rate of the A/D conversion.

24. The method of claim 23, further comprising glitch filtering the in-phase current component signal and the quadrature current component signal.

* * * * *